(12) United States Patent
Newton et al.

(10) Patent No.: US 10,791,317 B2
(45) Date of Patent: Sep. 29, 2020

(54) SWITCHING BETWEEN 3D VIDEO AND 2D VIDEO

(71) Applicant: KONINKLIJKE PHILIPS N.V., Eindhoven (NL)

(72) Inventors: Philip Newton, Eindhoven (NL); Fons Bruls, Eindhoven (NL); Wiebe De Haan, Eindhoven (NL); Joop Talstra, Eindhoven (NL); Erik Moll, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/524,267

(22) Filed: Jul. 29, 2019

(65) Prior Publication Data

US 2019/0356900 A1   Nov. 21, 2019

Related U.S. Application Data

(63) Continuation of application No. 15/898,749, filed on Feb. 19, 2018, now Pat. No. 10,419,740, which is a (Continued)

(30) Foreign Application Priority Data

Jul. 27, 2009   (EP) ..................... 09166461

(51) Int. Cl.
*H04N 13/194* (2018.01)
*H04N 13/359* (2018.01)
*H04N 13/398* (2018.01)

(52) U.S. Cl.
CPC ......... *H04N 13/194* (2018.05); *H04N 13/359* (2018.05); *H04N 13/398* (2018.05)

(58) Field of Classification Search
None
See application file for complete search history.

(56) References Cited

U.S. PATENT DOCUMENTS 6,573,928 B1   6/2003   Jones et al.
7,233,347 B2   6/2007   Jones et al.
(Continued)

FOREIGN PATENT DOCUMENTS

JP        63266980 A      11/1988
JP     2004328566 A      11/2004
(Continued)

*Primary Examiner* — Kaitlin A Retallick

(57) ABSTRACT

A three dimensional [3D] video signal is processed in a video device (50). The device has generating means (52) for generating an output signal for transferring the video data via a high-speed digital interface like HDMI to a 3D display, which selectively generate a 3D display signal for displaying the 3D video data on a 3D display operative in a 3D mode, a 2D display signal for displaying 2D video data on the 3D display operative in a 2D mode, or a pseudo 2D display signal by including 2D video data in the output signal for displaying the 2D video data on the 3D display operative in the 3D mode. Processing means (53) detect a request to display 2D video data on the 3D display, while the 3D display is operative in the 3D mode, and, in response to the detection, the generating means are set to generate the pseudo 2D display signal for maintaining the 3D mode of the 3D display.

20 Claims, 13 Drawing Sheets

Related U.S. Application Data continuation of application No. 13/386,687, filed as application No. PCT/IB2010/053318 on Jul. 21, 2010, now Pat. No. 9,924,154.

(56) References Cited

U.S. PATENT DOCUMENTS

| | | | |
|---|---|---|---|
| 9,924,154 B2 * | 3/2018 | Newton | H04N 13/194 |
| 10,419,740 B2 * | 9/2019 | Newton | H04N 13/359 |
| 2003/0053797 A1 | 3/2003 | Oshima | |
| 2004/0057612 A1 | 3/2004 | Tabata | |
| 2005/0030301 A1 | 2/2005 | Harrold | |
| 2005/0129325 A1 | 6/2005 | Wu | |
| 2006/0279750 A1 * | 12/2006 | Ha | H04N 13/178 358/1.2 |
| 2007/0008617 A1 | 1/2007 | Shestak | |
| 2007/0097024 A1 * | 5/2007 | Jung | H04N 13/337 345/32 |
| 2009/0091654 A1 | 4/2009 | Nakmura | |
| 2009/0185029 A1 | 7/2009 | Mitsuhashi | |
| 2010/0021141 A1 | 1/2010 | Yamashita | |
| 2010/0074594 A1 * | 3/2010 | Nakamura | H04N 13/361 386/241 |
| 2011/0012993 A1 | 1/2011 | Kuno | |

FOREIGN PATENT DOCUMENTS

| | | |
|---|---|---|
| WO | 2003053071 A1 | 6/2003 |
| WO | 2007117471 A2 | 10/2007 |
| WO | 2009077929 A1 | 6/2009 |
| WO | 2009077969 A1 | 6/2009 |
| WO | 2009077969 A2 | 6/2009 |

* cited by examiner

STN_table_3D_Syntax for one playitem

| Syntax | No. of bits | Mnemonic |
|---|---|---|
| STN_table_3D(section for one playitem) { | | |
|   Length | 16 | uimsbf |
|   reserved_for_future_use | 64 | bslbf |
|   for (video_stream_id=0;<br>    video_stream_id<number_of_video_stream_entries;<br>    video_stream_id++) { | | |
|     keep_3D_mode_during_playback | 1 | |
|     stream_entry() | | |
|     stream_entry_auxilliary_view() | | |
|     stream_attributes() | | |
|   } | | |
|   for (audio_stream_id=0;<br>    audio_stream_id<number_of_audio_stream_entries;<br>    audio_stream_id++) { | | |
|     stream_entry() | | |
|     stream_attributes() | | |
|   } | | |

| | | | | | | | | | | |
|---|---|---|---|---|---|---|---|---|---|---|
| for (PG_textST_stream_id=0;<br>PG_textST_stream_id<number_of_PG_textST_stream_entries;<br>PG_textST_stream_id++) { | | | | | | | | | | |
| keep_3D_mode_during_playback | 1 | | | | | | | | | |
| stream_entry() | | | | | | | | | | |
| stream_entry_auxilliary_view() | | | | | | | | | | |
| stream_attributes() | | | | | | | | | | |
| } | | | | | | | | | | |
| for (IG_stream_id=0;<br>IG_stream_id<number_of_IG_stream_entries;<br>IG_stream_id++) { | | | | | | | | | | |
| keep_3D_mode_during_playback | 1 | | | | | | | | | |
| stream_entry() | | | | | | | | | | |
| stream_entry_auxilliary_view() | | | | | | | | | | |
| stream_attributes() | | | | | | | | | | |
| } | | | | | | | | | | |

FIG. 7B

| Syntax | No. of bits | Mnemonic |
|---|---|---|
| stream_entry() { | | |
| Length | 8 | bslbf |
| Type | 8 | bslbf |
| if (type==1) { | | |
| ref_to_stream_PID_of_mainClip | 16 | uimsbf |
| reserved_for_future_use | 48 | bslbf |
| } else if (type==2) { | | |
| ref_to_SubPath_id | 8 | uimsbf |
| ref_to_subClip_entry_id | 8 | uimsbf |
| ref_to_stream_PID_of_subClip | 16 | uimsbf |
| reserved_for_future_use | 32 | bslbf |
| } | | |
| } | | |

| Type | Meaning |
|---|---|
| 0 | reserved |
| 1 | Identify an elementary stream of the Clip used by the PlayItem. |
| 2 | Identify an elementary stream of the Clip used by a SubPath associated with the PlayItem. |
| others | reserved |

FIG. 10

| Syntax | No. of bits | Mnemonic |
|---|---|---|
| stream_attributes() { | | |
|   Length | 8 | uimsbf |
|   stream_coding_type | 8 | bslbf |
|   } if (stream_coding_type==0x20) { | | |
|     Video_format | 4 | bslbf |
|     Frame_rate | 4 | bslbf |
|   } else if { ... other types ... } | | |
|   } | | |
| } | | |

SWITCHING BETWEEN 3D VIDEO AND 2D VIDEO

CROSS-REFERENCE TO PRIOR APPLICATIONS

This application is a continuation of U.S. patent application Ser. No. 15/898,749 filed Feb. 19, 2018 which is a continuation of U.S. patent application Ser. No. 13/386,687 filed on Jan. 24, 2012 which is a National Stage application of International Application No. PCT/IB2010/53318 filed Jul. 21, 2010 which claims the benefit of EP Patent Application 09166461.5 filed on Jul. 27, 2009. These applications are hereby incorporated by reference herein.

FIELD OF THE INVENTION

The invention relates to a video device for processing a three dimensional [3D] video signal, the device comprising receiving means for receiving the 3D video signal and retrieving 3D video data, and generating means for generating an output signal for transferring the video data via a high-speed digital interface to a 3D display, the generating means being arranged for generating in a 3D mode, as the output signal, a 3D display signal for displaying the 3D video data on the 3D display operative in a 3D mode, and generating in a 2D mode, as the output signal, a 2D display signal for displaying 2D video data on the 3D display operative in a 2D mode.

The invention further relates to a method of processing a 3D video signal, a method of providing a 3D video signal, a signal, a record carrier and a computer program product.

The invention relates to the field of selectively rendering 3D video data and 2D video data on a 3D display device.

BACKGROUND OF THE INVENTION

Devices for generating two dimensional (2D) video data are known, for example video servers, broadcasters, or authoring devices. Currently 3D enhanced devices for providing three dimensional (3D) image data are being proposed. Similarly video devices for processing display 3D video data are being proposed, like players for optical disc (e.g. Blu-ray Disc; BD) or set top boxes which render received digital video signals. The 3D video device is to be coupled to a 3D display device like a TV set or monitor. Video data is transferred from the source device via a suitable interface, preferably a high-speed digital interface like HDMI.

In addition to 3D content, such as 3D movies or TV broadcasts, additional, auxiliary 2D video data may be displayed, for example a menu, news flash or other announcements. Furthermore, in practice a user may select 3D video material or 2D video material at will from various sources. Moreover, the user may apply a setting to force displaying in a 2D mode, even when 3D video material is available.

Document WO2009/077929 describes approaches that could be taken to transition between 2D and 3D. A 3D video signal has video information and associated playback information, the video information and associated playback information being organized according to a playback format. The video information comprises a primary video stream for 2D display, and an additional information stream for enabling 3D display. The associated playback information comprises display information indicating the types of display possible. The display information is processed at the receiver to determine that both 2D display and 3D display are possible. A playback mode is set determining whether the video information should be displayed in 2D or 3D mode.

SUMMARY OF THE INVENTION

A problem of WO2009/077929 is that transitions between 3D and 2D playback that may occur require the display device to change video format and frequency. For example, in 3D mode a stereoscopic display alternates the left and right video in time, to allow a correct synchronization of the right video frames on a HDMI interface with the timing in the display. The synchronization requires signaling on the H- and/or V sync to correspond with the start of a left and/or right frame. This signaling on the HDMI interface causes the display to re-adjust itself when going from 3D to 2D and vice versa. These re-adjustments take time and can be very disturbing to the viewer.

It is an object of the invention to provide a system for transitioning between 3D and 2D in a more convenient way.

For this purpose, according to a first aspect of the invention, in the device as described in the opening paragraph, the generating means are arranged for generating in a pseudo 2D mode, as the output signal, a pseudo 2D display signal by including 2D video data in the output signal in the format of a 3D signal for displaying the 2D video data on the 3D display operative in the 3D mode, and the device comprises processing means for detecting a request for transitioning from the 3D mode to display 2D video data on the 3D display, and, in response to the detection, setting the generating means to generate the pseudo 2D display signal for maintaining the 3D mode of the 3D display.

For this purpose, according to a further aspect of the invention, the method of processing 3D video signal comprises
receiving the 3D video signal and retrieving 3D video data;
generating an output signal for transferring the video data via a high-speed digital interface to a 3D display, the generating being arranged for
generating in a 3D mode, as the output signal, a 3D display signal for displaying the 3D video data on the 3D display operative in a 3D mode,
generating in a 2D mode, as the output signal, a 2D display signal for displaying 2D video data on the 3D display operative in a 2D mode, and
generating in a pseudo 2D mode, as the output signal, a pseudo 2D display signal by including 2D video data in the output signal in the format of a 3D signal for displaying the 2D video data on the 3D display operative in the 3D mode; and
detecting a request for transitioning from the 3D mode to display 2D video data on the 3D display, and, in response to the detection,
setting the generating means to generate the pseudo 2D display signal for maintaining the 3D mode of the 3D display.

For this purpose, according to a further aspect of the invention, the method of providing a 3D video signal for transferring to a 3D video device as defined above comprises
generating the 3D video signal comprising 3D video data, and
including a switching indicator in the 3D video signal, the switching indicator being indicative of a 2D mode to be selected for, in the device, when detecting said request to display 2D video data, setting the generating means to generate the output signal in dependence of the switching indicator to either the 2D mode or the pseudo 2D mode.

For this purpose, according to a further aspect of the invention, the 3D video signal for transferring 3D video data to a 3D video device as defined above comprises the 3D video data and a switching indicator, the switching indicator being indicative of a 2D mode to be selected for, in the device, while detecting said request to display 2D video data, setting the generating means to generate the output signal in dependence of the switching indicator to either the 2D mode or the pseudo 2D mode.

The measures have the following effect. When a transition from the 3D mode to displaying 2D video is initiated, it is determined whether the output signal is currently in the 3D mode. If so, the display will also be operating in the 3D mode, which display mode is maintained by generating the pseudo 2D display signal, i.e. an output signal in the format of a 3D signal but containing only 2D video information. The display device continues to receive the display signal in the format of a 3D signal, and therefore will not switch back to 2D mode or re-synchronize. Advantageously the actual information shown to the user appears to be 2D, because any 3D information is lacking. For example, in a stereo video signal, i.e. 3D based on a left and right view, both views will have the same content. Therefore displaying such views appears to be 2D to the viewer.

The invention is also based on the following recognition. As consumers get used to viewing in 3D there will be a need to transition between 2D and 3D and between 3D and 2D. The user will of course expect that the presentation changes, however this transition should be un-obtrusive, and not cause black frames or other artifacts in the video, which would interfere with the movie experience. When transitioning from 3D to 2D serious delays and artifacts may occur related to re-configuration of the player, the interface signaling and the display. Hence prior to the invention it was virtually impossible to switch smoothly from 3D to 2D and back during playback of a movie. To overcome these issues it is proposed that if the user or the system initiates a switch between 3D and 2D mode, e.g. during 3D mode playback of a movie, that the mode of the display is not changed but is forcibly maintained. Thereto the proposed pseudo 2D signal includes 2D video data in the 3D video signal format. As a result, the presentation of the movie does smoothly change from 3D to 2D and vice versa, while the display maintains operative in 3D mode. For example this is achieved by a player device, which generates the display signal, by recognizing the situation and reacting differently to mode switches during 3D playback than when playback is stopped.

In an embodiment the generating means are arranged for, when transitioning between the 3D mode and the pseudo 2D mode, to apply a 3D offset to the 2D video data for changing the amount of 3D information. The effect is that the 2D data achieves a 3D effect in dependence of the offset. Advantageously applying an offset, e.g. a predetermined disparity or depth, does not require much calculating power.

In an embodiment the processing means are arranged for, in the pseudo 2D mode, combining graphical data and video data by positioning the graphical data in depth direction in front of the 2D video data by applying an offset to the graphical data to generate a left view and a right view. Advantageously the graphical data is now in front of 2D video data and will not interfere with the video data.

In an embodiment the receiving means are arranged for retrieving, from the 3D video signal, a switching indicator, the switching indicator being indicative of a 2D mode to be selected, and the processing means are arranged for, when detecting said request to display 2D video data, setting the generating means to generate the display signal in dependence of the switching indicator to either the 2D mode or the pseudo 2D mode. In particular, the 3D video signal including the switching indicator may be retrieved from a record carrier. The effect is that the originator of the 3D video signal has the opportunity to select the respective 2D mode that is activated when the user requires 2D viewing. Advantageously the originator either may block or allow the pseudo 2D display mode.

Further preferred embodiments of the method, 3D devices and signal according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which
FIG. 7A shows a stream number table,
FIG. 7B shows a stream number table,
FIG. 8 shows a stream entry,
FIG. 9 shows a table for defining the type in the stream entry,
and
FIG. 10 shows the syntax of stream attributes.

In the Figures, elements which correspond to elements already described have the same reference numerals.

DETAILED DESCRIPTION OF EMBODIMENTS

It is noted that the current invention may be used for any type of 3D display that has a depth range. Video data for the 3D displays is assumed to be available as electronic, usually digital, data. The current invention relates to such image data and manipulates the image data in the digital domain.

There are many different ways in which 3D images may be formatted and transferred, called a 3D video format. Some formats are based on using a 2D channel to also carry the stereo information. For example the left and right view can be interlaced or can be placed side by side and above and under. These methods sacrifice resolution to carry the stereo information.

A different 3D format is based on two views using a 2D image and an additional depth image, a so called depth map, which conveys information about the depth of objects in the 2D image. The format called image+depth is different in that it is a combination of a 2D image with a so called "depth", or disparity map. This is a gray scale image, whereby the gray scale value of a pixel indicates the amount of disparity (or depth in case of a depth map) for the corresponding pixel in the associated 2D image. The display device uses the disparity, depth or parallax map to calculate the additional views taking the 2D image as input. This may be done in a variety of ways, in the simplest form it is a matter of shifting pixels to the left or right dependent on the disparity value associated to those pixels. The paper entitled "Depth image based rendering, compression and transmission for a new approach on 3D TV" by Christoph Fehn gives an excellent overview of the technology (see http://iphome.hhi.de/fehn/Publications/fehn_EI2004.pdf).

Figure 1:
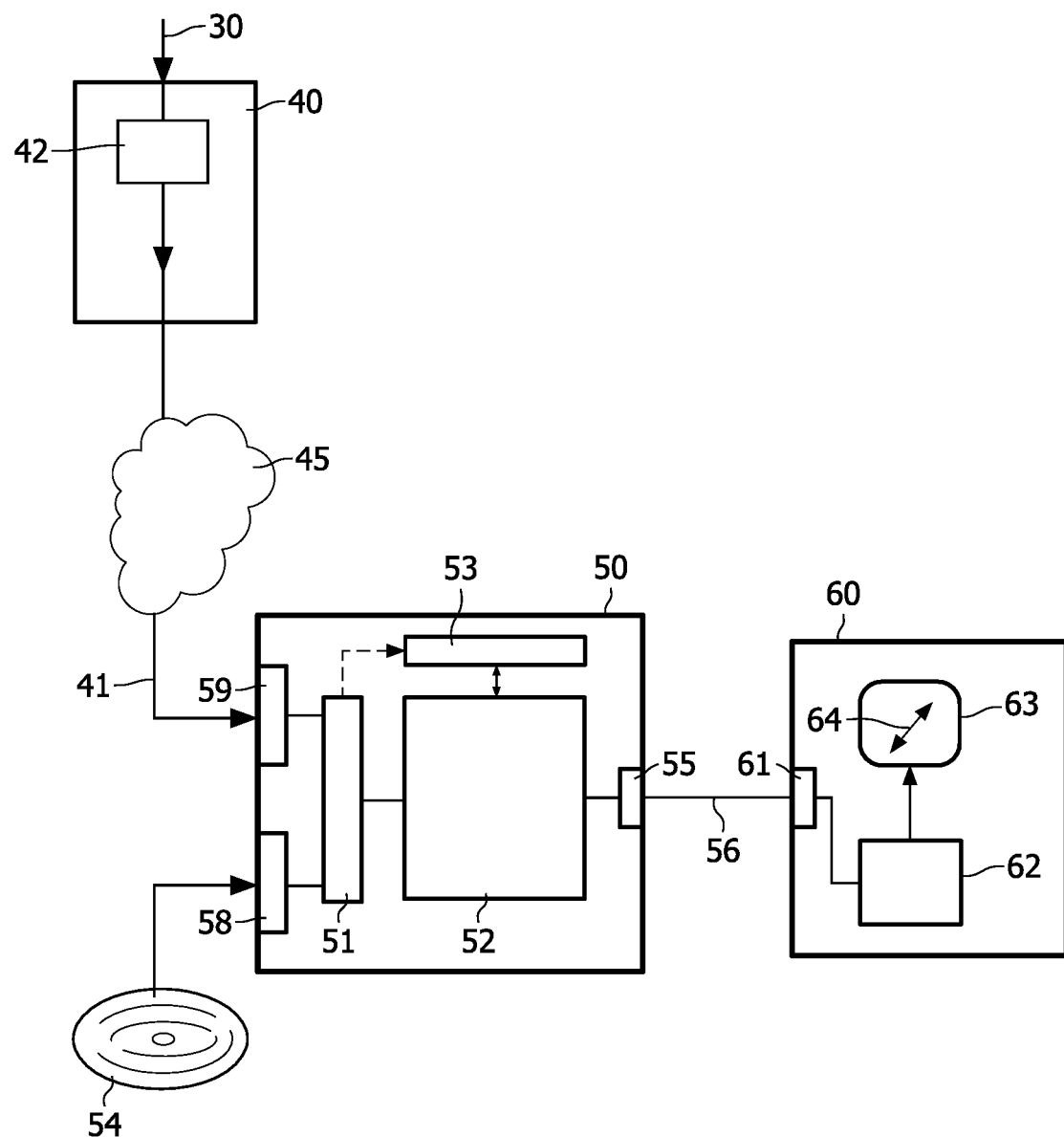
FIG. 1 shows a system for displaying 3D image data.

FIG. 1 shows a system for displaying three dimensional (3D) image data, such as video, graphics or other visual information. A 3D source device 40 transfers a 3D video signal 41 to a video device 50. The 3D video signal may be provided by a remote media server, a broadcaster, etc based on 3D video data available from storage, from 3D camera's, etc. The video device is coupled to a 3D display device 60 for transferring a 3D display signal 56. The 3D video device has an input unit 51 for receiving the 3D video signal. For example the device may include an optical disc unit 58 coupled to the input unit for retrieving the 3D video information from an optical record carrier 54 like a DVD or Blu-ray disc. Alternatively, the device may include a network interface unit 59 for coupling to a network 45, for example the internet or a broadcast network, such video device usually being called a set-top box. The video device may also be a satellite receiver, a media player, a personal computer, a mobile device, etc.

In an embodiment the 3D source device has a processing unit 42 for determining a switching indicator for switching between a 2D and 3D, and including the switching indicator in the 3D video signal, as explained below.

The 3D source device may be a server, a broadcaster, a recording device, or an authoring and/or production system for manufacturing record carriers like the Blu-ray Disc. Blu-ray Disc supports an interactive platform for content creators. For 3D stereoscopic video there are many formats. The major formats are stereo and the image-plus-depth format. Of these again there are many possible ways in which the content can be formatted to be suitable for use with new and existing 3D displays and distribution formats. More information on the Blu-ray Disc format is available from the website of the Blu-ray Disc association in a paper on the audio-visual application format. http://www.blu-ray-disc.com/Assets/Downloadablefile/2b_bdrom_audiovisualapplication_030 5-12955-15269.pdf. The production process further comprises the steps of deriving the physical pattern of marks in the tracks which embodies the 3D video signal including the depth metadata, and subsequently shaping the material of the record carrier to provide the tracks of marks on at least one storage layer.

The 3D video device has a generating unit 52 coupled to the input unit 51 for processing the 3D information for generating a 3D display signal 56 to be transferred via an output interface unit 55 to the display device, e.g. a display signal according to the HDMI standard, see "High Definition Multimedia Interface; Specification Version 1.3a of Nov. 10 2006" available at http://hdmi.org/manufacturer/specification.aspx. The generating unit 52 is arranged for generating the image data included in the 3D display signal 56 for display on the display device 60.

The generating unit is arranged for generating the display signal 56, in a selected one of the following ways. First the generating means may be set to generate, as the display signal, a 3D display signal for displaying the 3D video data on the 3D display operative in a 3D mode. The first status is the traditional generation of a 3D display signal. Secondly, the generating means may be set to generate, as the display signal, a 2D display signal for displaying 2D video data on the 3D display operative in a 2D mode. The second status is the traditional way of generation of a 2D display signal. The display will be forced to operate in a 2D display mode. Thirdly, the generating means may be set to generate, as the display signal, a pseudo 2D display signal by including 2D video data in the display signal for displaying the 2D video data on the 3D display operative in the 3D mode. It is noted that the pseudo 2D signal has the format of a 3D video signal and will be handled by the display as 3D information. However, as the actual video data embedded in the signal is 2D data, the viewer will experience the video in 2D.

The video device has a processing unit 53 for detecting a request to display 2D video data on the 3D display. The request includes any condition that indicates that 2D mode is needed, such as a user command to switch to 2D mode, the source material may change to 2D source material, the system may initiate a 2D mode for displaying announcements or menu's, etc. Secondly, the processing unit detects that the current operational mode of the display is 3D, for example by detecting that currently a 3D program is being rendered. Hence it is detected that the 3D display is operative in the 3D mode. Finally, in response to the detection of the request while the display is in 3D mode, the processing unit is arranged for setting the generating means 52 to generate the pseudo 2D display signal for maintaining the 3D mode of the 3D display.

The 3D display device 60 is for displaying 3D image data. The device has an input interface unit 61 for receiving the 3D display signal 56 including the 3D video data transferred from the video device 50. The transferred 3D video data is processed in processing unit 62 for displaying on a 3D display 63, for example a dual or lenticular LCD. The display device 60 may be any type of stereoscopic display, also called 3D display, and has a display depth range indicated by arrow 64.

Alternatively the processing of the 3D video signal and the transitioning between 3D and 2D mode is performed in an embodiment of the display device. The 3D video data, and optional the switching indicator, are transferred via the display signal 56. The switching is initiated locally in the display device, e.g. by a user command. The processing unit 62 now performs the functions of generating the pseudo 2D display signals which are directly coupled to the 3D display. The processing means 62 may be arranged for the corresponding functions as described below for the generating means 52 and the processing means 53 in the video device.

In a further embodiment the video device 50 and the display device 60 are integrated in a single device, where a single set of processing means performs said 2D/3D switching functions.

FIG. 1 further shows the record carrier 54 as a carrier of the 3D video signal. The record carrier is disc-shaped and has a track and a central hole. The track, constituted by a series of physically detectable marks, is arranged in accordance with a spiral or concentric pattern of turns constituting substantially parallel tracks on an information layer. The record carrier may be optically readable, called an optical disc, e.g. a CD, DVD or BD (Blu-ray Disc). The information is represented on the information layer by the optically detectable marks along the track, e.g. pits and lands. The track structure also comprises position information, e.g. headers and addresses, for indication the location of units of information, usually called information blocks. The record carrier 54 carries information representing digitally encoded image data like video, for example encoded according to the MPEG2 or MPEG4 encoding system, in a predefined recording format like the DVD or BD format.

In various embodiments the generating means 52 and the processing means 53 in the video device are arranged for executing the following functions as described in detail below.

Figure 2A:
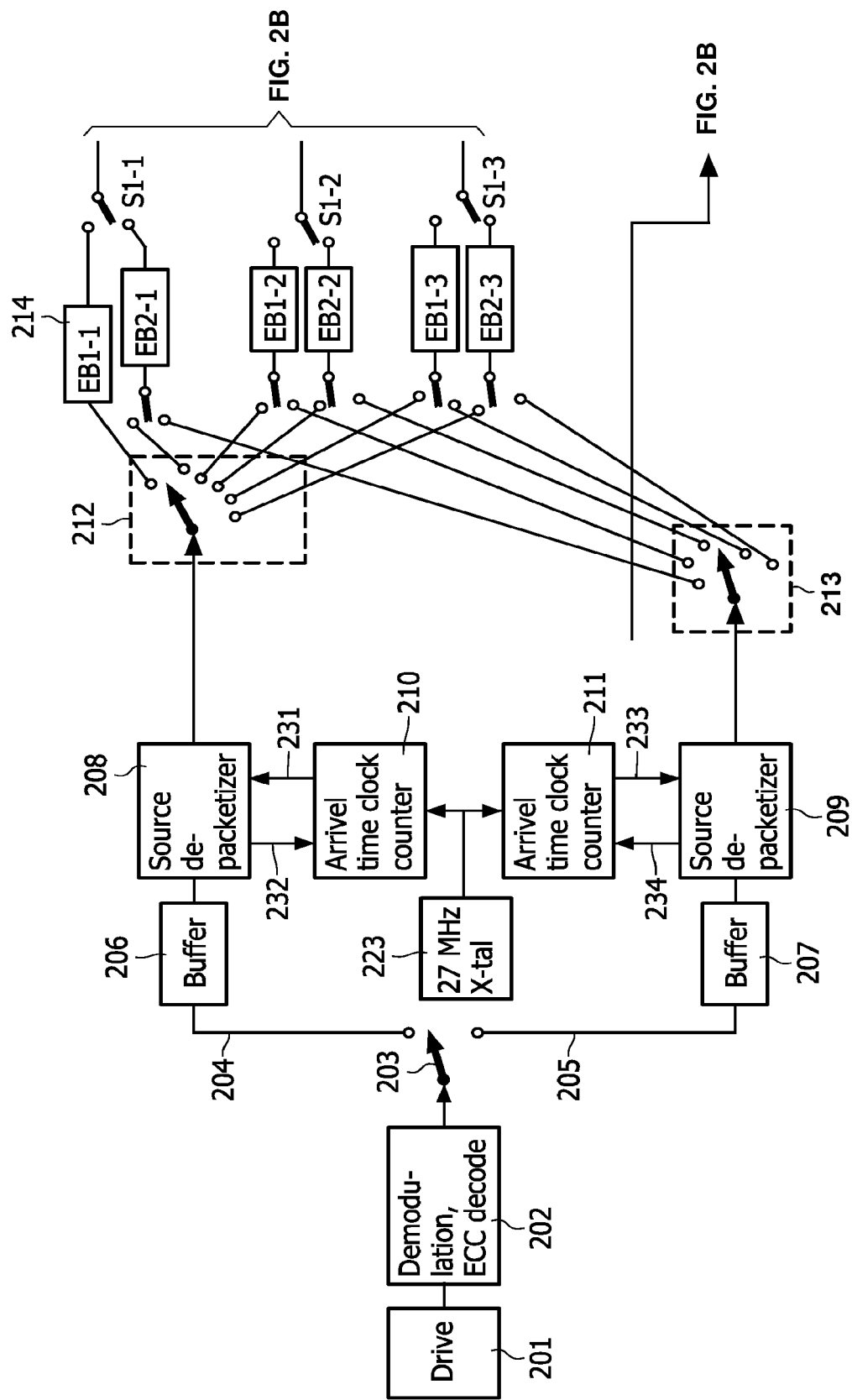
FIG. 2A shows part of a decoder model of a 3D player.
Figure 2B:
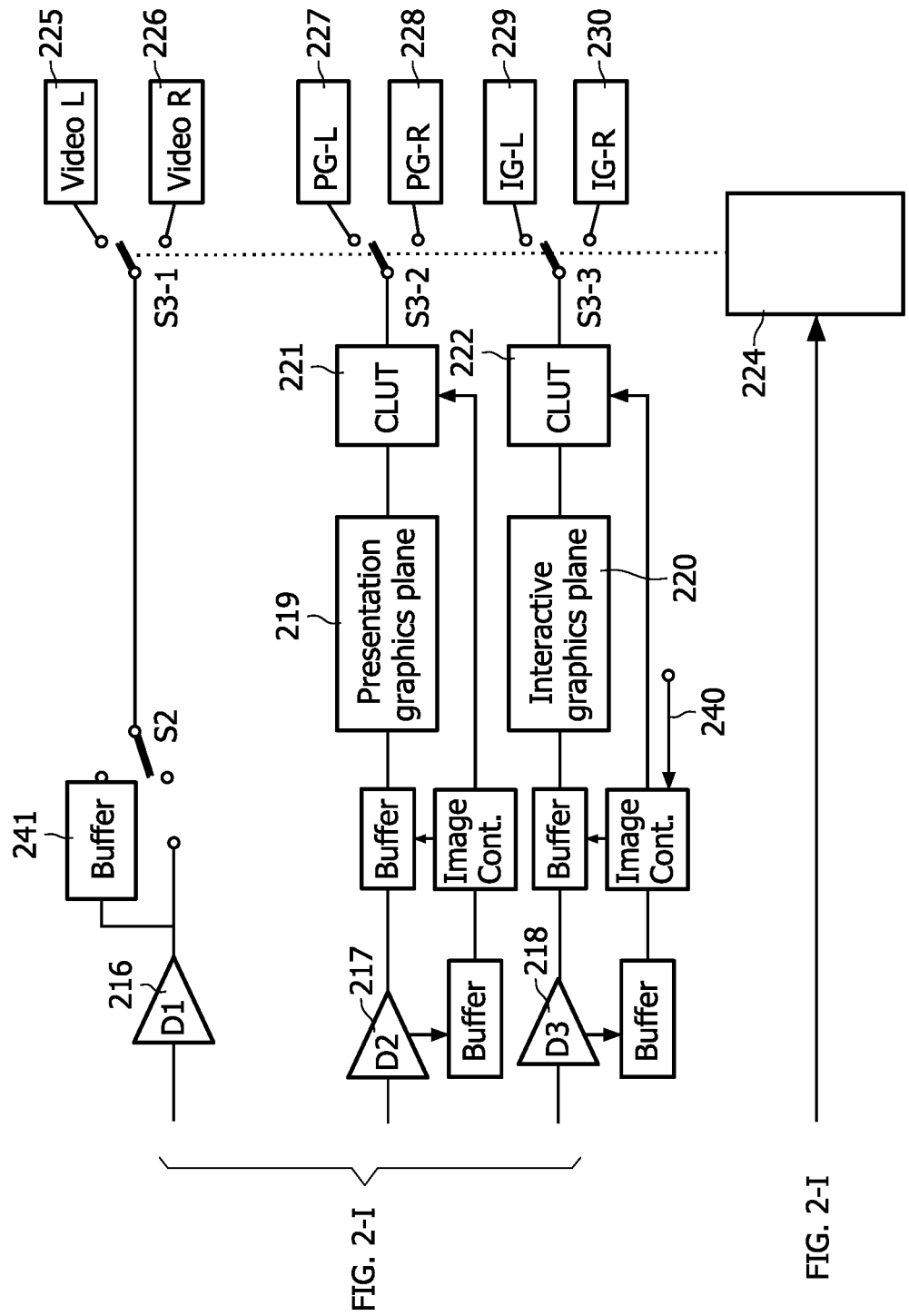
FIG. 2B shows part of a decoder model of a 3D player.

FIGS. 2A and 2B show a decoder model of a 3D player. The player is adapted for playback of stereoscopic 3D content, e.g. a modified Blu-ray Disc player. A disc drive unit 201 is coupled to a disc processor 202 for demodulation and error correction (ECC) decoding. Video data is retrieved from the stream read from the disc and a switch 203 provides a main transport stream TS 204 to a buffer 206 coupled to a source de-packetizer 208, which provides the data to a PID filter 212, which is a de-multiplexer that identifies the packet identification (PID) from the main TS and transfers each type of data to respective buffers 214 called EB1-1, EB2-1 for the main 3D video data; EB1-2 and EB2-2 for presentation graphics data and EB1-3 and EB2-3 for interactive graphics data.

Similarly the switch 203 provides a sub transport stream TS 205 to a buffer 207 coupled to a source de-packetizer 209, which provides the data to a second PID filter 213, which is a de-multiplexer that identifies the packet identification (PID) from the sub TS and transfers each type of data also to respective buffers 214.

The de-packetizers 208, 209 also provide initial values 232, 234 to arrival time clock counters 210, 211, which return arrival time clock (i) values 231, 233 to the de-packetizers based on a reference clock generator 223.

Respective switches S1-1, S2-2 and S1-3 forward the data to decoder 216 (D1) for main 3D video; to decoder 217 (D2) for presentation graphics and decoder 218 (D3) for interactive graphics. Decoded data is transferred to respective buffers. Main video data is selected by switch S2 from the decoder 216 or the buffer 241, and is transferred to switch S3-1, which provides the final data for a main video Left view 225 and a main video Right view 226.

Similarly Presentation graphics (PG) data from decoder 217 is transferred to respective buffers and a presentation graphics plane generator 219 cooperating with a color lookup table (CLUT) 221. PG data is selected by switch S3-2 from the generator 219 to provide the final data for a PG-Left view 227 and a PG-Right view 228.

Similarly Interactive graphics (IG) data from decoder 218 is transferred to respective buffers and a IG plane generator 220 cooperating with a color lookup table (CLUT) 222. IG data is selected by switch S3-3 from the generator 220 to provide the final data for a IG-Left view 229 and a IG-Right view 230. Interactive user input may be accommodated via input 240.

Processing unit 224 controls the operation of the various switches for generating the display signal by including in the output either full 3D data, normal 2D data or pseudo 2D data.

The function of the device shown in FIG. 2A and FIG. 2B is now further described. Packets are filtered from the transport stream that has be retrieved from the disc based on their PID values and stored in the corresponding buffers indicated by EB1-1 to EB3-3. Packets belonging to elementary streams carrying the main 2D video and the corresponding 2D graphics streams are placed in the top buffers EB1-1 through EB1-3 and the packets for the auxiliary streams for 3D are placed in EB2-1 through EB2-3. The auxiliary stream may be a dependent stream for encoding right view data in dependence of left view data of the main stream, or depth data such as a depth map and transparency data, etc. Switch S1-1 through to S1-3 selects the appropriate buffers and feeds the packets through to the decoders D1 to D3. After decoding the decoded video and graphics is composited onto the output and selection of the left and right video and graphics is done by switch S3-1 through to S3-3.

Figure 3:
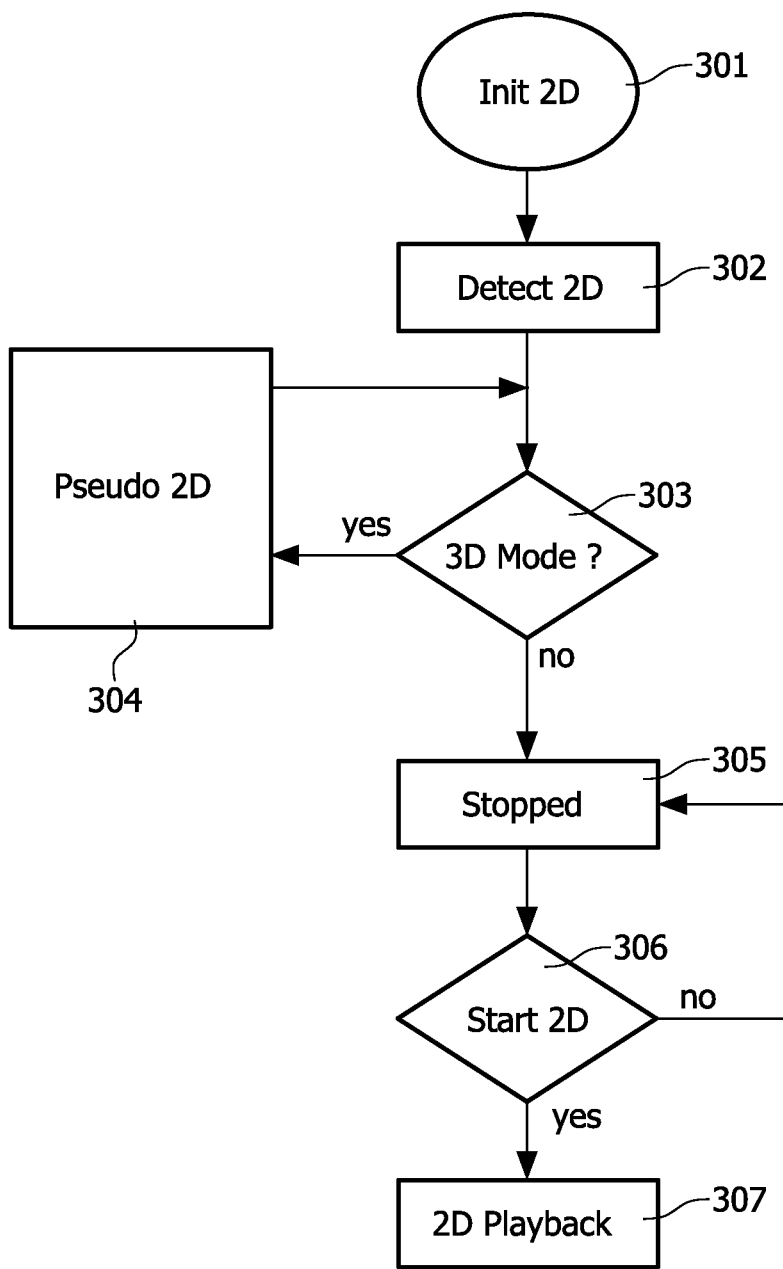
FIG. 3 shows controlling the pseudo 2D mode.

FIG. 3 shows controlling the pseudo 2D mode. The function may be implemented in a dedicated control unit, or by appropriate control software in a processor. First at Init 2D 301, it is detected that a 2D display mode is requested, e.g. by a user command or a system call. At step 302 "Detect 2D" the requested 2D display mode is registered, e.g. in a status register. Subsequently either the normal 2D display signal is generated, or the pseudo 2D signal, as follows. At the test "3D Mode?" 303 it is determined if the display signal is currently providing 3D video data to the 3D display. If Yes, the pseudo 2D signal is generated at Pseudo 2D 304. Thereto in step 307, 2D playback in 3D mode is activated by setting (in fact maintaining) Switch S1-1 . . . S1-3 to the L position, while maintaining the output mode 3D to maintain playback in 3D mode at the display. However, if No (i.e. the current playback is stopped; no 3D material is being rendered), the process continues at "Stopped" 305, where the output mode is set to 2D. When it is detected at step 306 "Start 2D" 206 that playback is activated, the playback is performed by generating a 2D display signal.

It is noted that, by setting the switches to use the left view twice, the generating means are arranged for generating the pseudo 2D display signal by deriving image data without 3D information from the input 3D video data. Alternatively, for a image+depth video signal, the depth map may be replaced by a single value representing a single depth, preferably at the display surface (zero depth).

It is noted that, when after playback in pseudo 2D mode for a period of time the user stops the playback, the mode may automatically switch to normal 2D mode. Alternatively, the display system may remain in pseudo 2D until the user gives a further command to actually go to normal 2D mode. Thereto the processing means may be arranged for, while the generating means generate the pseudo 2D display signal, detecting that rendering the 3D video data has ended, and, in response to the detection, setting the generating means to generate the 2D display signal.

Figure 4:
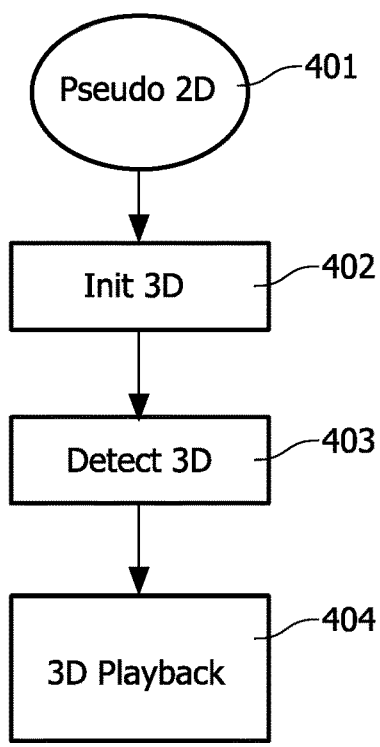
FIG. 4 shows controlling 3D playback when in the pseudo 2D mode.

FIG. 4 shows controlling 3D playback when in the pseudo 2D mode. The sequence of steps is performed when the user request to switch playback mode from 2D to 3D, while the system is in pseudo 2D mode. Initially at step 401 "Pseudo 2D" the system is generating the pseudo 2D display signal. At step 402 "Init 3D" the user may request the display mode to go to 3D. In step 403 "Detect 3D" the requested 3D display mode is registered, e.g. in a status register. Subsequently the normal 3D display signal is generated at step "3D Playback" 404 by activating 3D playback in 3D mode so that Switch S1-1 . . . S1-3 toggle between L and R.

FIGS. 3 and 4 illustrate how the transition between 3D and 2D and back may be performed when, during playback of a 3D (stereoscopic) movie title, the user decides to change playback to 2D mode. The player sets the player register that holds the current output mode to 3D. It then checks whether playback is currently active, if so the output mode is maintained but playback of the auxiliary or dependent view is replaced by repeating the main view. This is achieved by keeping switch S1-1 through to S1-3 in the "L" position (top position of switches S1-1 to S1-3 in FIG. 1-1). At the end of playback of the current title and at the start of a new title the player device may check the status of the output player setting register and initiate playback in 2D if the user selects a title.

To achieve a smooth transition the playback device should maintain the signaling on the interface the same. The interface typically used in Blu-ray Disc players is HDMI. Transmission and signaling of stereoscopic content over HDMI is defined in the specification. There are several stereoscopic video formats that can be transmitted over HDMI, here we will only explain how one commonly used format is transmitted namely frame alternative stereoscopic video, similar principles apply to transmission and signaling of other stereoscopic video formats (line alternative, side-by-side, checkerboard etc). In the examples of FIG. 5 a display signal according to the HDMI standard is shown. However, any video signal that has a format to control a 3D video display may be similarly adapted to implement the pseudo 2D mode.

Figure 5A:
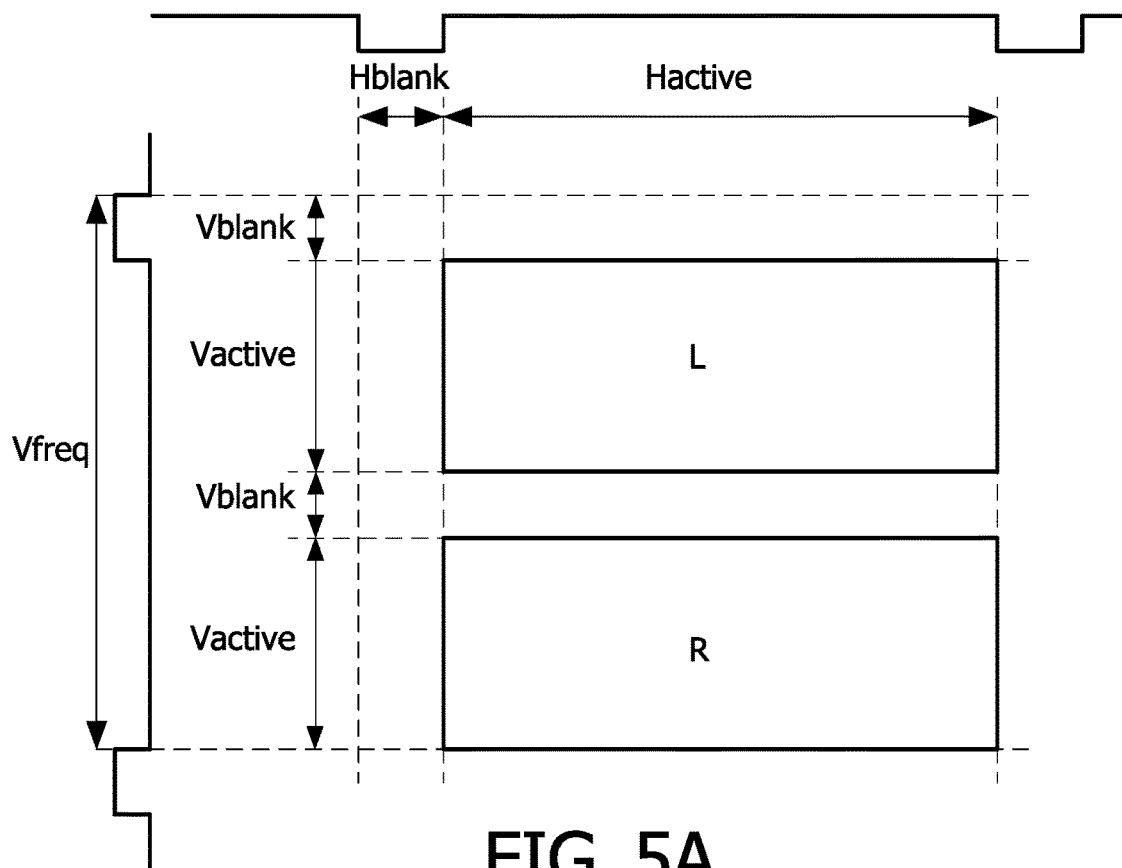
FIG. 5A shows a 3D display signal.

FIG. 5A shows a 3D display signal. The timing and blanking periods used when transmitting frame alternative stereoscopic video according to HDMI. Signaling to indicate where the left frame ends and the right frame begins is done by inserting a vertical blanking period. A typical timing for this format would be 1920x1080 at 24 fps and with a Vfreq of 24 Hz and blanking periods of Hblank 830, Vblank 45 with the pixel clock running at 148.500 MHz.

Figure 5B:
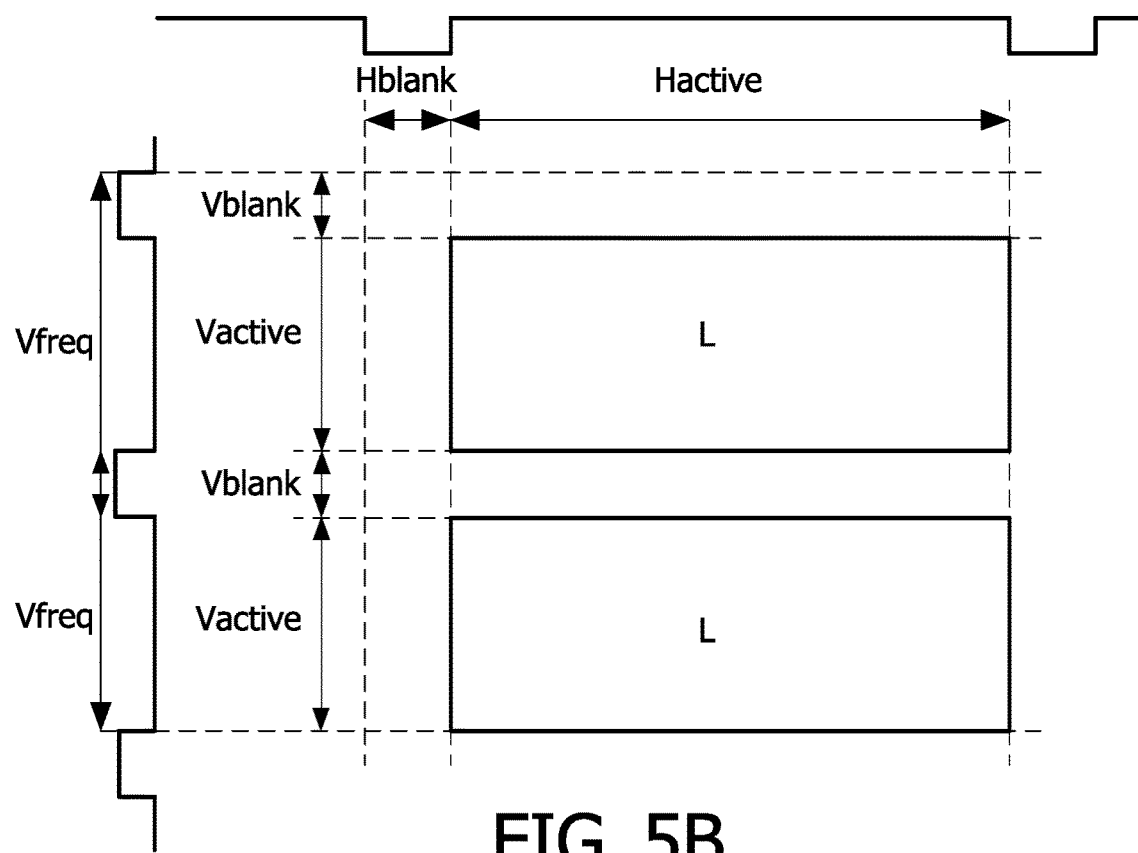
FIG. 5B shows a display signal for normal 2D playback.

FIG. 5B shows a display signal for normal 2D playback. For example the signal may carry 1920x1080 video at 24 fps with Vfreq of 24 Hz and blanking periods of Hblank 830, Vblank 45 with a pixel clock of 74.250 MHz. Although the signaling of both these formats are similar the pixel clock runs twice as fast and there is an additional vertical blanking period in the stereoscopic format. Changes to the pixel clock will typically require re-configuration of the interface and cause frame loss. Therefore the pseudo 2D display signal is proposed for 2D/3D mode changes during playback.

Figure 5C:
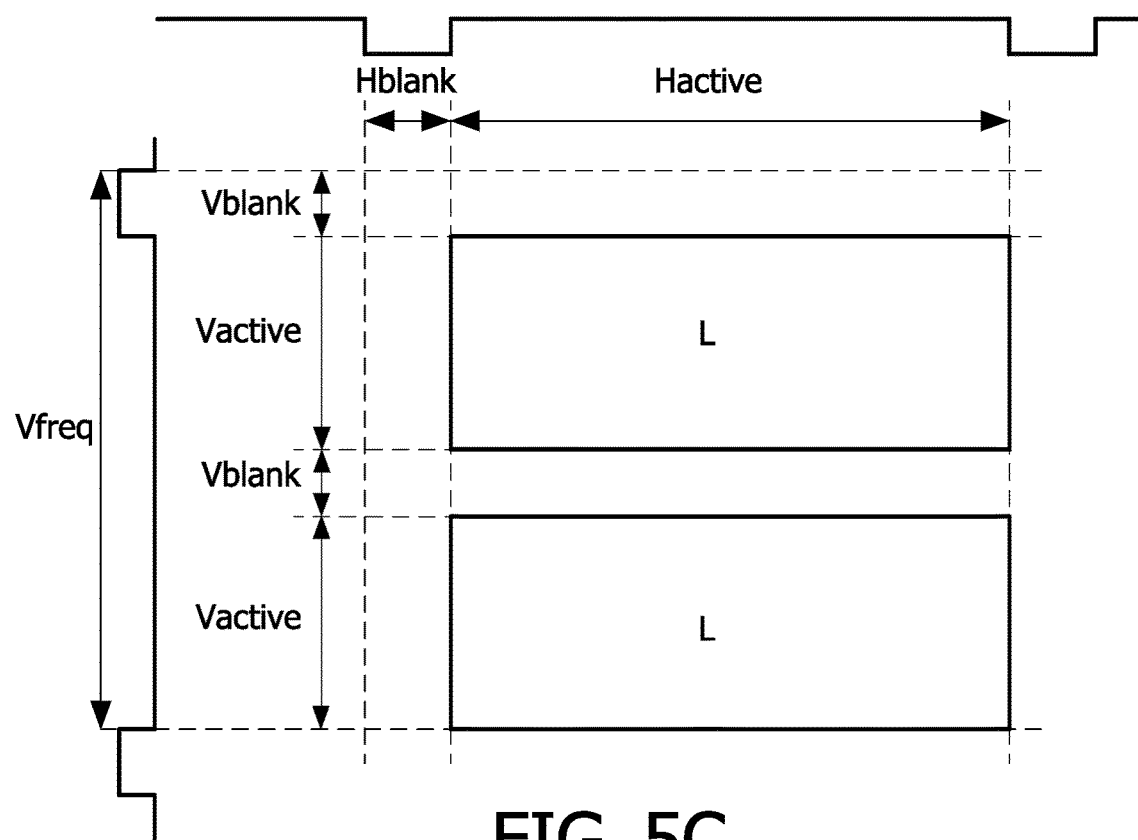
FIG. 5C shows a display signal for pseudo 2D playback.

FIG. 5C shows a display signal for pseudo 2D playback. In the signal the pixel frequency is maintained at the level of the 3D signal shown in FIG. 5A, but that the Right frame is replaced by repeating the Left frame as is shown. In particular the Vertical Frequency signal marks the difference with the normal 2D signal of FIG. 5B.

The Blu-ray Disc standard uses a playlist structure to define all the signaling required for a player to playback a 2D or 3D title. A playlist is a sequence of playitems, a playitem is a list of segments of a stream that together make up the presentation (Video, Audio streams, subtitles and other graphics). Inside every playitem there is a table that lists all the elementary streams that are decoded and presented during playback of the playitem, this table is referred to as the STreamNumber (STN)-table; see FIGS. 7A and 7B.

In an embodiment when transitioning between 3D and 2D playback an offset is applied to the 2D image and also to the graphics. 2D image data is used to generate 3D data as illustrated in FIG. 6. The generating unit as discussed above are arranged for, when transitioning between the 3D mode and the pseudo 2D mode, to apply a 3D offset to the 2D video data for changing the amount of 3D information.

The offset may be stored on the disc in a table and may be used when the playback device does not support full 3D stereoscopic playback. Alternatively the offset may be a predefined value set in the player, or selected by the user, etc.

When transitioning between 3D and 2D and back the offset may be gradually applied to the main 2D image when switching from 2D to 3D and gradually reduced when transitioning between 3D and 2D. Thereto the generating means are arranged for applying the 3D offset gradually for gradually changing the amount of 3D information.

Figure 6A:
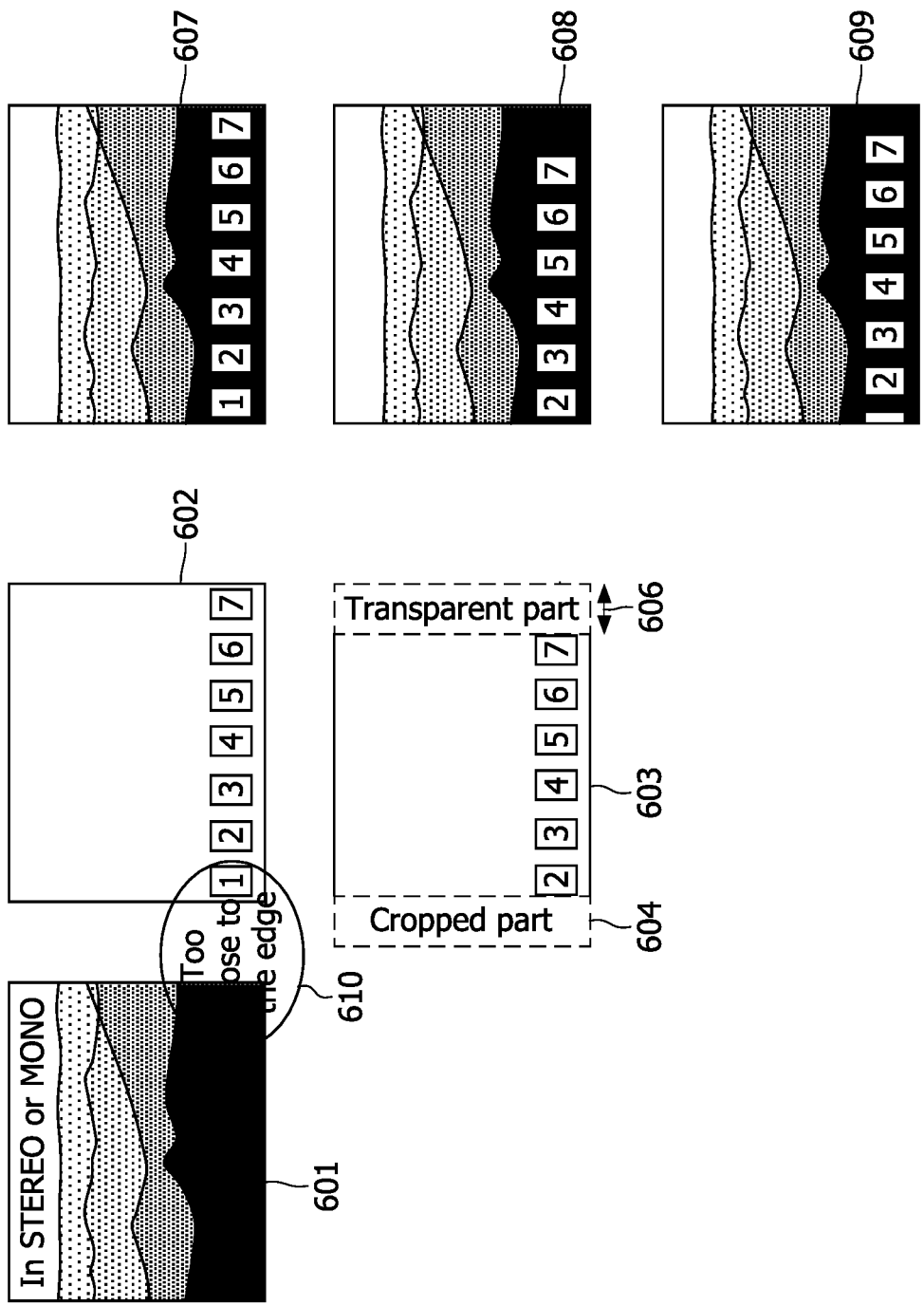
FIG. 6A shows applying a 3D offset.

FIG. 6A shows applying a 3D offset. An example of 2D image data 601 is combined with graphical 2D data 602, which is to be positioned in depth direction in front of the background image 601. The combined image is used as a left view 607. An offset 606 is applied to graphical 2D data 603 as a disparity shift to generate a right view 608. The user will experience a combined 3D view 609. Due to the shift a part 604 of the graphics is cropped, while a further part remains blank or transparent because no information is available to fill the area.

For stereoscopic graphics created by applying an offset to a 2D image problems can occur when the offset is applied on the 2D image in one direction. When the relevant part of the 2D image is located near the border of the plane after applying an offset part of the image may fall beyond the boundaries of the plane as is shown in FIG. 6A at element 610, element 619 and 622 of 6B. The numeral 1 will partly disappear in the final view 609.

Figure 6B:
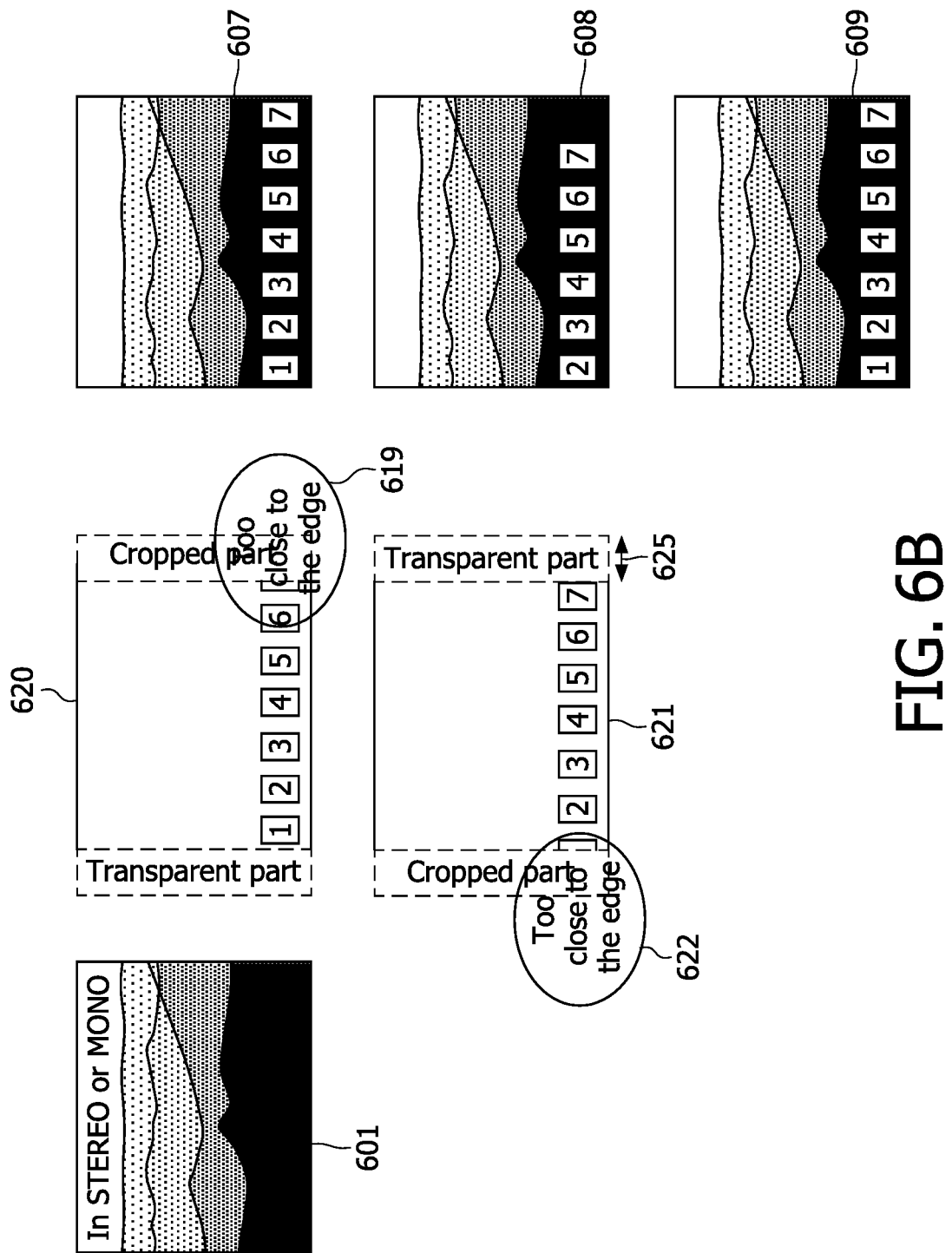
FIG. 6B shows applying a dual 3D offset.

FIG. 6B shows applying a dual 3D offset. The offset is divided by 2 and applied to both the Left and the Right output plane (but in opposite directions) of graphical 2D data 620 and 621. By applying half of the offset 625 to generate both output planes, so on the 2D image in both directions, the cropping effect can be reduced as is shown in FIG. 6B. Thereto the generating means are arranged for applying the 3D offset by shifting 2D video in opposite directions to generate a left output plane and a right output plane.

Figure 6C:
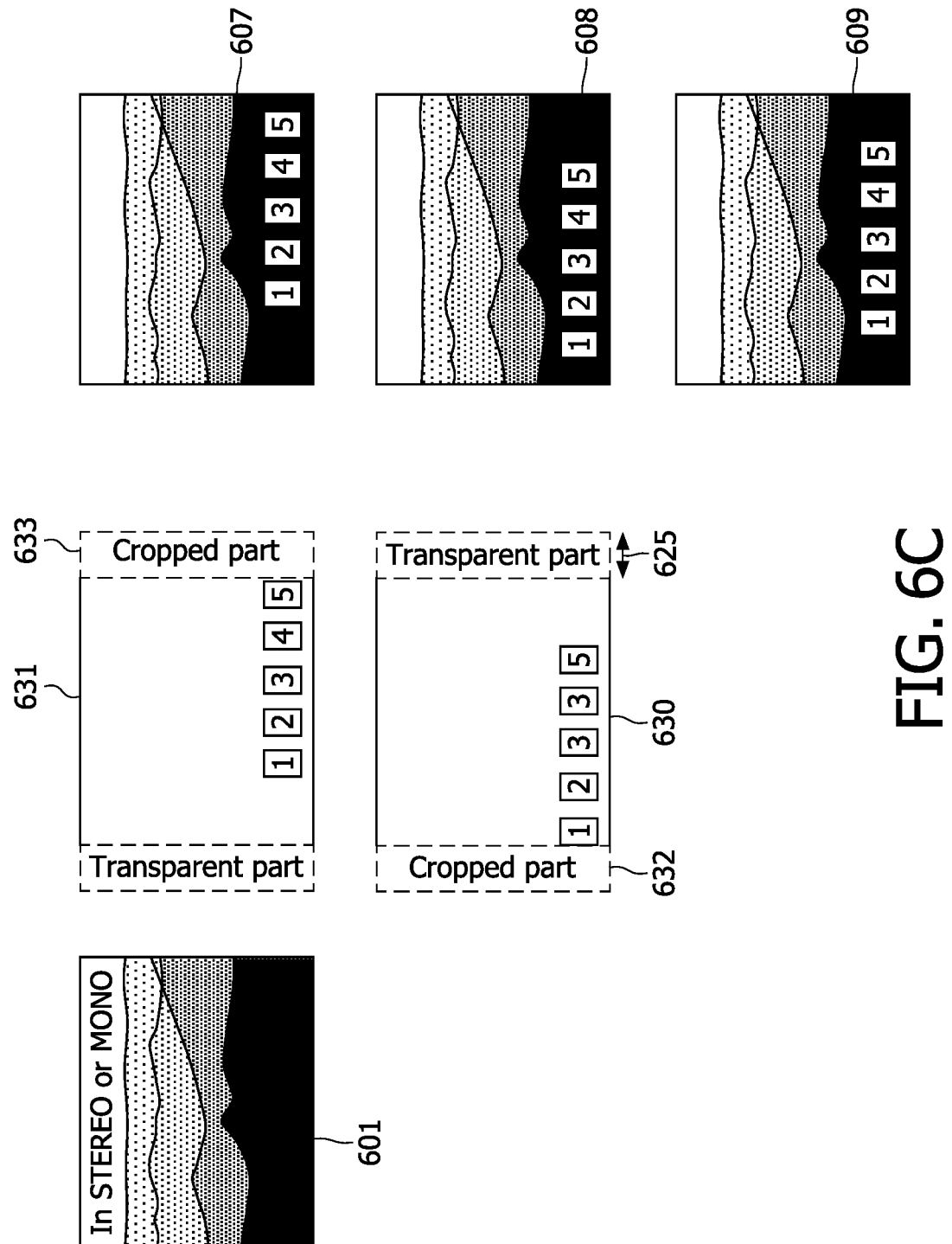
FIG. 6C shows avoiding border cut-off while applying offset.

FIG. 6C shows avoiding border cut-off while applying offset. The Figure shows a re-edited version of the graphics information. The left offset version 630 and the right offset version 631 both do not contain elements in the cropped parts 632, 633. Hence the final view is improved by during authoring ensuring that the image+the applied offset remain inside the boundaries of both left and right planes.

In a further embodiment non-linear stretching and scaling is applied to both the left and right view when using an offset applied to a 2D image to create a stereoscopic perception. When applying an offset and shifting the image to the left and/or right parts of the (video and/or graphics) image background is de-occluded. In case that there is no background information available to fill in those de-occluded areas the output image is cropped. To avoid the user being disturbed by this sudden cropping of the image the image is scaled non-linearly to fill in the missing de-occluded areas. Thereto the generating means are arranged for non linear stretching of the 2D video during said shifting for covering parts of the 3D signal that would remain blank on the display due to said shifting.

FIGS. 7A and 7B show a stream number table, which defines the various data streams in the 3D video signal, called STN_table_3D. The table shows an example of an STN_table_3D for one playitem. Additional entries (as discussed below) are included to a regular 2D STN_table. An auxiliary stream entry may reference a dependent stream as is the case with stereoscopic video or may contain a depth map stream or both. Typically the main entry will contain the independent video for stereoscopic video, e.g. encoded according to MPEG-4 MVC, while the sub-path of the auxiliary stream can be used to refer to a depth- or disparity map that is selected in combination with or instead of the dependent video stream.

For playback of a playitem that contains 3D content such as a MPEG MVC stream, that consists of a main and a dependent elementary stream, the STN_table is extended to support signaling to identify not only the main video stream (as is the case for normal) 2D playback, but also the dependent stream for the 3D data. Two options are available for including this information. A new playlist type may be defined or the additional signaling is added as extension data to the playlist which an existing player will ignore. In both cases a new entry to the STN_table is added that contains an entry for every (stereoscopic) 3D stream beyond the base view viz. the dependent or secondary view streams. The 3D enhanced STN_table is referred to as the STN_table_3D and typically for compatibility reasons would be added as extension data to a playlist whereby the STN_table stereoscopic has a loop of playitems and per playitem contains the stream entries for the main and auxiliary streams.

The following fields are to be noted in the STN_table for defining the STN_table_3D Semantics:

length: This 16 bit field indicates the number of bytes of the STN_table( ) immediately following this length field and up to the end of the STN_table( ).

keep_3D_mode_during_playback

This field indicates the behavior of the player when transitioning from 3D to 2D mode during playback of a movie title. If set to 0b then the player switches modes. If set to 1b the player will maintain the mode in 3D but the player will maintain the L, R plane switches S1-1 . . . S1-3 in the "L" position such that the presentation of the video and/or graphics content goes to 2D by generating the pseudo 2D signal. This signal may be maintained until playback of the current running title stops or until the user changes playback mode back to 3D.

stream entry( ) This section defines the stream_entry( ) of the STN_table( ); see FIG. 8 stream_entry_auxilliary_view( ) This entry defines the additional video data stream that constitutes 3D information, such as a dependently coded Right view or depth map. Syntax and semantics are the same as for the stream_entry of the main view.

stream_attributes( ) This field defines the stream_attributes( ) of the STN_table( ); see FIG. 10.

In an embodiment, instead of one STN_table_3D for a whole playlist, an STN-table_3D may be added to each playitem. Furthermore, a new playlist specifically for 3D playback may be defined, instead of an extension to a 2D playlist.

To minimize transition delays and artifacts during transitions between 3D back to 2D mode a new entry, called switching indicator, can be added that allows the content author to indicate the desired behavior during a transition between 3D to 2D and vice versa. The switching indicator is indicative of a 2D mode to be selected. The options for this selection are: (a) to switch player modes or (b) to indicate to continue playback in 3D mode but with zero disparity (pseudo 2D mode).

For accommodating the switching indicator in the video device of FIG. 1, the receiving means are arranged for retrieving, from the 3D video signal, the switching indicator. The processing unit 53 is arranged for, when detecting said request to display 2D video data, setting the generating means to generate the display signal in dependence of the switching indicator to either the 2D mode or the pseudo 2D mode.

In an embodiment the field keep_3D_mode_during_playback 71, 72, 73 is an example of the switching indicator that indicates the pseudo 2D switching mode is to be selected, or normal 2D mode. In the example the indicator 71 is provided for the main video data, a further indicator 72 is provided for the presentation graphics data and a further indicator 73 is provided for the interactive graphics data. Note that in other embodiments this field may be omitted, may be just one indicator for all streams, or may be extended to indicate further conditions of 2D/3D mode switching.

A method of providing the 3D video signal comprises generating the 3D video signal comprising 3D video data, and including the switching indicator in the 3D video signal. The 3D video signal thus generated may be transferred via a network, broadcasted, stored on a record carrier, etc. The method may further include the step of manufacturing a record carrier, the record carrier being provided with a track of marks representing the 3D video signal.

FIG. 8 shows a stream entry. The stream entry defines the parameters of the respective stream. In particular the following fields are to be noted in the stream entry table for defining the syntax:

length: This 8 bit field indicates the number of bytes of the stream_entry( ) immediately following this length field and up to the end of the stream_entry( ).

type: This 8-bit field indicates the type of database for identifying an elementary stream referred to by a stream number for the stream_entry( ); see FIG. 9.

ref_to_stream_PID_of_mainClip: This 16-bit field indicates a value from the stream_PID[0][stream_index] entries defined in the ProgramInfo( ) of the Clip referred to by the Clip_Information_file_name[0]/Clip_Information_file_name[angle_id] of the PlayItem( ).

ref_to_SubPath_id: This 8-bit field indicates a value from SubPath_id entries defined in the PlayList( ).

ref_to_subClip_entry_id: This 8-bit field indicates a value from the subClip_entry_id entries defined in a SubPlayItem of the SubPath referred to by the ref_to_SubPath_id.

ref_to_stream_PID_of_subClip: This 16-bit field indicates a value from the stream_PID[0][stream_index] entries defined in the ProgramInfo( ) of the Clip referred to by the Clip_Information_file_name referred to by the ref_to_subClip_entry_id.

FIG. 9 shows a table for defining the type in the stream_entry. The value of

Type identifies the structure of the respective stream in the 3D video signal, as indicated in the table.

FIG. 10 shows the syntax of stream attributes. The stream attributes are part of the STN table as shown in FIGS. 7A and 7B. In particular the following fields are to be noted in the stream attribute syntax:

length: This 8 bit field indicates the number of bytes of the stream_attributes( ) immediately following this length field and up to the end of the stream_attributes( ).

stream_coding_type: This 8-bit field indicates the coding type of the elementary stream associated with a stream number for the stream_attributes( ), and shall be set to a predefined value, e.g. 0x20 to indicate a MVC coded dependent stream or 0x21 to indicate a depth or disparity map.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A device for processing a video signal comprising:
an input circuit, the input circuit arranged to receive the video signal and a video data,
wherein the video data comprises three-dimensional video data and two-dimensional video data,
wherein the two-dimensional video data does not provide sufficient information to enable construction of stereoscopic images,
wherein the three-dimensional video data provides a single sequence of three-dimensional images,
wherein the two-dimensional video data provides a single sequence of two-dimensional images;
a generating circuit, the generating circuit arranged to generate an output signal,
wherein the output signal transfers the video data to a three-dimensional display,
wherein the generating comprises generating a three dimensional display signal for displaying the three dimensional video data,
wherein the three-dimensional signal comprising a left eye view and a right eye view,
wherein the generating circuit generates a two-dimensional display signal for displaying two-dimensional video data on the three-dimensional display,
wherein the three-dimensional display is operative in a two-dimensional mode,
wherein the generating circuit generates each of the two-dimensional images in both the left eye view and the right eye view by including two-dimensional video data in the output signal in the format of a three-dimensional signal to enable the two-dimensional video data to be displayed on the three dimensional display when the three-dimensional display is operative in the three-dimensional mode; and
a processor circuit,
wherein the processor circuit detects a transition signal,
wherein the transition signal indicates a transition from displaying the three-dimensional display signal in the three-dimensional mode to display two-dimensional video data on the three-dimensional display,
wherein, in response to the transition signal, the processor circuit selects the generating circuit to generate each of the two-dimensional images in both the left eye view and the right eye view from the video data to maintain the three-dimensional mode of the three-dimensional display, thereby enabling a continuous viewing of the sequence of three-dimensional images followed by the sequence of two-dimensional images, without visual anomalies.

2. The device of claim 1, wherein the generating circuit, generates the two-dimensional video data by deriving image data without three-dimensional information from the three-dimensional video data while generating each of the two-dimensional images in both the left eye view and the right eye view.

3. The device of claim 2, wherein the generating circuit, changes the amount of three-dimensional information displayed by applying a three-dimensional offset to the two-dimensional video data when transitioning between the three-dimensional mode and generating each of the two-dimensional images in both the left eye view and the right eye view.

4. The device of claim 1, wherein the processor circuit combines graphical data and video data by positioning the graphical data in depth direction in front of the two-dimensional video data by applying an offset to the graphical data to generate each of the two-dimensional images in both the left eye view and the right eye view.

5. The device of claim 3, wherein the generating circuit gradually changes the amount of three-dimensional information by applying the three-dimensional offset gradually.

6. The device of claim 3, wherein the generating circuit applies the three-dimensional offset by shifting two-dimensional video or graphical data in opposite directions to generate a left output plane and a right output plane.

7. The device of claim 5, wherein the generating circuit covers one or more blank parts of the three-dimensional display signal by non-linearly stretching the two-dimensional video during the application of the three-dimensional offset, wherein the one or more blank parts are due to the application of the three-dimensional offset.

8. The device of claim 1, wherein the processor circuit detects that rendering the three-dimensional video data has ended, wherein the processor circuit sets the generating circuit to generate the two-dimensional display signal in response to the detection, while the generating circuit generates each of the two-dimensional images in both the left eye view and the right eye view.

9. The device of claim 1, wherein the input circuit retrieves, from the three-dimensional video signal, a switching indicator, wherein the switching indicator is indicative of a two-dimensional mode to be selected, wherein the processor circuit, sets the generating circuit to generate the output signal in dependence on the switching indicator to either the two-dimensional display signal or each of the two-dimensional images in both the left eye view and the right eye view when detecting the transition signal to display two-dimensional video data.

10. The device of claim 1, wherein the input circuit includes a record carrier reader for reading a record carrier for receiving the three-dimensional video signal.

11. The device of claim 1, further comprising the three-dimensional display.

12. A method of processing a video signal, the method comprising:
receiving the video signal and a video data,
wherein the video data comprises three-dimensional video data and two-dimensional video data,
wherein the two-dimensional video data does not provide sufficient information to enable construction of stereoscopic images,
wherein the three-dimensional video data provides a single sequence of three-dimensional images,
wherein the two-dimensional video data provides a single sequence of two-dimensional images;
generating an output signal for transferring the video data to a three-dimensional display,
wherein the generating comprises generating a three-dimensional display signal for displaying the three-dimensional video data,
wherein the three-dimensional signal comprises a left eye view and a right eye view, on the three-dimensional display,
wherein the three-dimensional display is operative in a three-dimensional mode;
generating a two-dimensional display signal for displaying two-dimensional video data on the three-dimensional display,
wherein the three-dimensional display is operative in a two-dimensional mode;
generating each of the two-dimensional images in both the left eye view and the right eye view by including two-dimensional video data in the output signal in the format of a three-dimensional signal to enable the two-dimensional video data to be displayed on the three-dimensional display when the three-dimensional display is operative in the three-dimensional mode;
detecting a transition signal, wherein the transition signal indicates a transition displaying the three-dimensional display signal in the three-dimensional mode to display two-dimensional video data on the three-dimensional display; and,
in response to the transition signal, selecting the generating to generate each of the two-dimensional images in both the left eye view and the right eye view from the video data to maintain the three-dimensional mode of the three-dimensional display, thereby enabling a continuous viewing of the sequence of three-dimensional images followed by the sequence of two-dimensional images, without visual anomalies.

13. The method as claimed in claim 12, wherein the generating includes a switching indicator in the three-dimensional video signal, wherein the switching indicator indicates a two-dimensional mode to be selected, wherein detecting the transition signal to display two-dimensional video data generates the output signal in dependence on the switching indicator to either the two-dimensional mode or each of the two-dimensional images in both the left eye view and the right eye view.

14. The method as claimed in claim 12, further comprising manufacturing a record carrier, wherein the record carrier is provided with a track of marks representing the three-dimensional video signal.

15. A computer-readable, non-transitory medium having stored therein instructions for causing a processing circuit to execute a method for processing a video signal, the medium comprising code for:
receiving the video signal and a video data,
wherein the video data comprises three-dimensional video data and two-dimensional video data,
wherein the two-dimensional video data does not provide sufficient information to enable construction of stereoscopic images,
wherein the three-dimensional video data provides a single sequence of three-dimensional images,
wherein the two-dimensional video data provides a single sequence of two-dimensional images;
generating an output signal for transferring the video data to a three-dimensional display,
wherein the generating comprises generating a three-dimensional display signal for displaying the three-dimensional video data, the three-dimensional signal comprising a left eye view and a right eye view, on the three-dimensional display,
wherein the three-dimensional display is operative in a three-dimensional mode;
generating a two-dimensional display signal for displaying two-dimensional video data on the three-dimensional display,
wherein the three-dimensional display is operative in a two-dimensional mode;
generating each of the two-dimensional images in both the left eye view and the right eye view by including two-dimensional video data in the output signal in the format of a three-dimensional signal to enable the two-dimensional video data to be displayed on the three-dimensional display when the three-dimensional display is operative in the three-dimensional mode;
detecting a transition signal, wherein the transition signal indicates a transition from displaying the three-dimensional display signal in the three-dimensional mode to display two-dimensional video data on the three-dimensional display; and,
in response to the transition signal, selecting the generating to generate each of the two-dimensional images in both the left eye view and the right eye view from the video data to maintain the three-dimensional mode of the three-dimensional display, thereby enabling a continuous viewing of the sequence of three-dimensional images followed by the sequence of two-dimensional images, without visual anomalies.

16. The medium of claim 15, comprising code for generating the two-dimensional video data by deriving image data without three-dimensional information from the three-dimensional video data while generating each of the two-dimensional images in both the left eye view and the right eye view.

17. The medium of claim 15, comprising code for applying a three-dimensional offset to the two-dimensional video data for changing the amount of three-dimensional information displayed, when transitioning between the three-dimensional mode and displaying each of the two-dimensional images in both the left eye view and the right eye view.

18. The medium of claim 17, comprising code for gradually changing the amount of three-dimensional information by applying the three-dimensional offset gradually.

19. The medium of claim 17, comprising code which cover one or more blank parts of the three-dimensional display signal by for non-linearly stretching the two-dimensional video during the application of the three-dimensional offset, wherein the one or more blank parts are due to the three-dimensional offset.

20. The medium of claim 15, comprising code for detecting that rendering the three-dimensional video data has ended, and, in response to the detection, setting the generating circuit to generate the two-dimensional display signal while generating each of the two-dimensional images in both the left eye view and the right eye view.

\* \* \* \* \*